United States Patent
Seo et al.

(10) Patent No.: US 11,549,025 B2
(45) Date of Patent: Jan. 10, 2023

(54) FILM FOR BLOCKING ULTRAVIOLET RAYS

(71) Applicant: LG CHEM, LTD., Seoul (KR)

(72) Inventors: Kwangseok Seo, Daejeon (KR); Heon Kim, Daejeon (KR); Jinseok Byun, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 378 days.

(21) Appl. No.: 16/631,525

(22) PCT Filed: Jun. 12, 2019

(86) PCT No.: PCT/KR2019/007093
§ 371 (c)(1),
(2) Date: Jan. 16, 2020

(87) PCT Pub. No.: WO2020/004835
PCT Pub. Date: Jan. 2, 2020

(65) Prior Publication Data
US 2020/0199380 A1 Jun. 25, 2020

(30) Foreign Application Priority Data

Jun. 29, 2018 (KR) .................. 10-2018-0075903
Jun. 11, 2019 (KR) .................. 10-2019-0068578

(51) Int. Cl.
C09D 7/41 (2018.01)
G02B 1/14 (2015.01)
C09D 7/48 (2018.01)
C09D 133/14 (2006.01)

(52) U.S. Cl.
CPC .............. C09D 7/41 (2018.01); C09D 7/48 (2018.01); C09D 133/14 (2013.01); G02B 1/14 (2015.01)

(58) Field of Classification Search
None
See application file for complete search history.

(56) References Cited

U.S. PATENT DOCUMENTS

| | | | | |
|---|---|---|---|---|
| 2002/0168494 | A1* | 11/2002 | Nagata | G03F 7/029 428/64.2 |
| 2006/0132030 | A1* | 6/2006 | Gao | H01L 51/5237 313/511 |
| 2009/0274896 | A1 | 11/2009 | Takeshi et al. | |
| 2010/0021739 | A1 | 1/2010 | Aruga et al. | |
| 2011/0151223 | A1 | 6/2011 | Kim et al. | |
| 2012/0080089 | A1 | 4/2012 | Aoyama et al. | |
| 2014/0247486 | A1 | 9/2014 | Shibata et al. | |
| 2015/0116820 | A1 | 4/2015 | Kumagai | |
| 2015/0260889 | A1 | 9/2015 | Shiono et al. | |
| 2019/0039281 | A1 | 2/2019 | Kwak et al. | |
| 2019/0103521 | A1* | 4/2019 | Umehara | H01L 33/50 |

FOREIGN PATENT DOCUMENTS

| | | | | |
|---|---|---|---|---|
| CN | 101240124 A | * | 8/2008 | ............. B82Y 30/00 |
| CN | 102105304 A | | 6/2011 | |
| CN | 102449040 A | | 5/2012 | |
| EP | 2840109 A1 | | 2/2015 | |
| EP | 2843008 A1 | | 3/2015 | |
| JP | 2001-344923 A | | 12/2001 | |
| JP | 2002309100 A | * | 10/2002 | |
| JP | 2009-269946 A | | 11/2009 | |
| JP | 2010-072616 A | | 4/2010 | |
| JP | 2012-076386 A | | 4/2012 | |
| JP | 2012-234164 A | | 11/2012 | |
| JP | 2014-210698 A | | 11/2014 | |
| JP | 2016-107498 A | | 6/2016 | |
| JP | 2016-157109 A | | 9/2016 | |
| JP | 2017-054506 A | | 3/2017 | |
| JP | 2017-173566 A | | 9/2017 | |
| KR | 10-2009-0127898 A | | 12/2009 | |
| KR | 10-2013-0135671 A | | 12/2013 | |
| KR | 10-2017-0004940 A | | 1/2017 | |
| KR | 10-2017-0112554 A | | 10/2017 | |
| KR | 10-2018-0031598 A | | 3/2018 | |
| WO | 2007-023919 A1 | | 3/2007 | |
| WO | 2009-126115 A1 | | 10/2009 | |
| WO | 2013-094633 A1 | | 6/2013 | |
| WO | 2014-188831 A1 | | 11/2014 | |
| WO | 2015-196622 A1 | | 12/2015 | |
| WO | 2017-154977 A1 | | 9/2017 | |
| WO | WO-2017164155 A1 | * | 9/2017 | ............... F21S 2/00 |
| WO | 2018-052686 A1 | | 3/2018 | |

OTHER PUBLICATIONS

JP-2002309100-A—English translation (Year: 2002).*
CN-101240124-A—English translation (Year: 2008).*
Extended European Search Report dated Oct. 1, 2020, issued in European Patent Application No. 19816186.1, 10 pages.
Database WPI, Week 201660, Thomson Scientific, London, GB; AN 2016-54625D, Sep. 1, 2016, 3 pages.
International Search Report and Written Opinion issued for PCT Application No. PCT/KR2019/007093 dated Oct. 4, 2019, 8 pages.

* cited by examiner

*Primary Examiner* — Stefanie J Cohen
(74) *Attorney, Agent, or Firm* — Rothwell, Figg, Ernst & Manbeck, P.C.

(57) ABSTRACT

The present invention relates to a film for blocking ultraviolet rays that has excellent light resistance, thus exhibiting stable UV blocking performance for a long time, and has a low haze value, and thus is suitable for protecting an organic light emitting device and the like from the external light source.

18 Claims, No Drawings

FILM FOR BLOCKING ULTRAVIOLET RAYS

CROSS-REFERENCE TO RELATED APPLICATION

This application is a 35 U.S.C. § National Phase Entry Application from PCT/KR2019/007093, filed on Jan. 12, 2019, and designating the United States, which claims the benefit of Korean Patent Application No. 10-2018-0075903 filed on Jun. 29, 2018 and Korean Patent Application No. 10-2019-0068578 filed on Jun. 11, 2019 with the Korean Intellectual Property Office, the disclosures of which are herein incorporated by reference in their entirety.

TECHNICAL FIELD

The present invention relates to a film for blocking ultraviolet rays that has excellent light resistance and a low haze value, and thus is suitable for protecting an organic light emitting device and the like.

BACKGROUND ART

Among solar rays, ultraviolet rays corresponding to the region of about 10 to 400 nm has higher energy than visible rays or infrared rays, and thus has an energy level capable of exciting or cutting the molecular bond of organic compounds and the like.

Particularly, an organic light emitting device (OLED) has recently been widely used as a material for displays, and if it is exposed to ultraviolet rays and blue light of 405 nm or less, damage to organic compounds such as blue light emitting materials existing in the organic material layer, and shrinkage of pixel diaphragm or outgassing, and ultimately loss of the function of a device, may occur.

Thus, in order to protect OLED devices from ultraviolet rays, a technology of introducing a coating layer including organic dyes capable of absorbing UV on the OLED devices has been suggested. However, the organic dyes, if exposed to UV for a long time, may be degraded and gradually lose the UV absorbing property, and thus cannot maintain the initial UV blocking performance, and ultimately may cause deterioration of the life cycle characteristic of OLED products.

Therefore, there is a demand for the development of a film for blocking ultraviolet rays having excellent light resistance that can effectively protect an OLED device from external light.

DETAILED DESCRIPTION OF THE INVENTION

Technical Problem

It is an object of the present invention to provide a film for blocking ultraviolet rays that may stably exhibit UV blocking performance even if exposed to UV for a long time, and has a low haze value, and thus is suitable for application in OLED display devices and the like.

Technical Solution

In order to achieve the object, the present invention provides a film for blocking ultraviolet rays including: a polymer base; a undercoat layer including UV absorbing organic dyes and a photocurable binder resin; and an overcoat layer including UV blocking inorganic particles and a photocurable binder resin, which are sequentially laminated, wherein transmittance after a light resistance test is 3 times or less of the transmittance before the light resistance test, when transmittance at a 405 nm wavelength is measured using a UV-VIS NIR spectrophotometer before and after conducting the following light resistance test:

[Light Resistance Test Method]

exposed under a UVA lamp at a temperature of 50° C., irradiance of 0.55 W/m$^2$, and a wavelength of 290 to 400 nm, for 48 hours.

The film for blocking ultraviolet rays may have transmittance at 430 nm, measured using the UV-VIS-NIR spectrophotometer, before the light resistance test, of 60% or more.

Further, the film for blocking ultraviolet rays may have a haze value measured according to the JIS K 7136 method of 1.5 or less.

The UV absorbing organic dye may be one or more selected from the group consisting of benzotriazole-based compounds, triazine-based compounds, ester-based compounds, indole-based compounds, and pyrimidine-based compounds.

The UV absorbing organic dye may be included in the content of 1 to 10 wt %, based on the total weight of the undercoat layer.

The refractive index of the UV blocking inorganic particles may be 1.8 to 2.1.

The average particle diameter of the UV blocking inorganic particles may be 20 to 200 nm.

The UV blocking inorganic particle may be zinc oxide.

The UV blocking inorganic particles may be included in the content of 10 to 50 wt %, based on the total weight of the overcoat layer.

The photocurable binder resin may be one or more photopolymerizable compounds selected from:

a group of reactive acrylate oligomers consisting of a urethane acrylate oligomer, an epoxide acrylate oligomer, polyester acrylate, and polyether acrylate; and a group of multifunctional (meth)acrylate-based monomers consisting of trimethylolpropane tri(meth)acrylate, pentaerythritol di(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, and glycerine propoxylate triacrylate.

The thickness of the undercoat layer may be 1 to 10 µm.
The thickness of the overcoat layer may be 1 to 5 µm.

Effect of the Invention

The film for blocking ultraviolet rays of the present invention has excellent light resistance, thus maintaining stable UV blocking performance even if exposed to UV for a long time, and has a low haze value, thus exhibiting high transparency, and thus it can be suitably used for a protection film for OLED display devices.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise", "equipped", "have", etc. are intended to designate the existence of a practiced characteristic, number, step, constructional element, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to a specific disclosure, and that the present invention includes all modifications, equivalents, or replacements thereof without departing from the spirit and technical scope of the invention.

Hereinafter, the present invention will be explained in detail.

The present invention provides a film for blocking ultraviolet rays including: a polymer base; a undercoat layer including UV absorbing organic dyes and a photocurable binder resin; and an overcoat layer including UV blocking inorganic particles and the photocurable binder resin, which are sequentially laminated, wherein the transmittance after a light resistance test is 3 times or less of the transmittance before the light resistance test, when transmittance at a 405 nm wavelength is measured using a UV-VIS NIR spectrophotometer before and after conducting the following light resistance test:

[Light Resistance Test Method]

exposed under a UVA lamp of a temperature of 50° C., irradiance of 0.55 W/m$^2$, and a wavelength of 290 to 400 nm, for 48 hours.

Since the film for blocking ultraviolet rays includes UV blocking inorganic particles, in addition to UV absorbing organic dyes, so as to prevent the degradation of the dyes, light resistance may be remarkably improved, and thus a change in transmittance may be small even if exposed to UV for a long time. Preferably, the transmittance after conducting the light resistance test may be 2.5 times or less, or 2.3 times of less, or 2.2 times or less of the transmittance before the light resistance test.

Further, in order to secure transparency of the film for blocking ultraviolet rays, it is preferable that transmittance at 430 nm, measured using the UV-VIS-NIR spectrophotometer, before the light resistance test, is 60% or more, or 63% or more.

A film for blocking ultraviolet rays for protecting OLED devices should secure performance for blocking blue light of 405 nm or less and in the UV region, and simultaneously, it should be transparent so as to not hinder the color sense manifested from the devices. Thus, it should have low transmittance at the wavelength of 405 nm or less, and high transmittance at the wavelength of 430 nm or more, and the film for blocking ultraviolet rays of the present invention exhibits the above transmittance properties by fulfilling predetermined constructions.

In addition, the haze value of the film for blocking ultraviolet rays, measured according to a JIS K 7136 method, may be 1.5 or less, more preferably 1.2 or less, or 1 or less. Since the film for blocking ultraviolet rays of the present invention has a low haze value and excellent transmittance and light resistance, it may be suitably used for a protection film of OLED devices and the like, and contribute to the life cycle characteristics of OLED devices.

According to one embodiment of the present invention, the film for blocking ultraviolet rays may include: a polymer base; an undercoat layer including UV absorbing organic dyes and a photocurable binder resin; and an overcoat layer including UV blocking inorganic particles and a photocurable binder resin, which are sequentially laminated.

Herein, the polymer base side becomes a side contacting one side of an OLED device, and the overcoat layer becomes a side exposed to UV. Thus, the UV absorbing organic dyes of the undercoat layer may be protected from UV exposure by the UV blocking inorganic particles of the overcoat layer. Therefore, compared to the case of using only UV absorbing organic dyes without UV blocking inorganic particles, the degradation speed of the organic dyes may be remarkably reduced, and UV blocking performance of the film may be maintained even if exposed to UV for a long time.

Thus, in case the film for blocking ultraviolet rays is used as a protection film of an OLED device, the organic material of the OLED device may be sufficiently protected by the UV absorbing organic dyes of the undercoat layer and the UV blocking inorganic particles of the overcoat layer, and deterioration of UV blocking performance of the film may be insignificant even if exposed to UV for a long time, and thus the OLED device may be effectively protected for a long time, and the life cycle characteristic of the device may be remarkably improved.

As the polymer base used for the film for blocking ultraviolet rays, a base having low transmittance in the wavelength region of 380 nm or less may be advantageous, and a base having high transmittance at a 430 nm wavelength and haze of less than 2.5 may be preferably used. For example, the material of the base may be triacetyl cellulose, a cycloolefin polymer, polyacrylate, polycarbonate, polyethylene terephthalate, and the like, preferably, triacetyl cellulose or polyethylene terephthalate, and more preferably, triacetyl cellulose having very low transmittance at the wavelength of 380 nm or less and low haze. Further, the thickness of the base film may be 10 to 300 μm considering productivity and the like, but is not limited thereto.

As the UV absorbing organic dyes, one or more selected from benzotriazole-based compounds, triazine-based compounds, ester-based compounds, indole-based compounds, and pyrimidine-based compounds may be preferably used. Since these compounds have low transmittance in the wavelength around 400 nm, they can more effectively protect OLED devices from UV and blue light. Meanwhile, although benzophenone-based compounds, cyanacrylate-based compounds, and oxalanilide-based compounds are also known as UV absorbing organic dyes, these dyes have high transmittance in the wavelength around 400 nm, and thus are not suitable for use as a UV blocking film for protecting OLED devices. Therefore, in order to secure the effect of the present invention, it is preferable that one or more selected from benzotriazole-based compounds, triazine-based compounds, ester-based compounds, indole-based compounds, and pyrimidine-based compounds are used.

The benzotriazole-based compound, triazine-based compound, ester-based compound, indole-based compound, and pyrimidine-based compound have benzotriazole, triazine, ester, indole, and pyrimidine moieties, respectively, and they are not specifically limited as long as they exhibit the above-explained effect, but specifically, one or more selected from the group consisting of product names Tinuvin® 384 (benzotriazole-based), Tinuvin® CarboProtect (benzotriazole-based), Tinuvin® 477(triazine-based), Eusorb UV1990 (ester-based), BONASORB UA-3912(indole-based), and FDB-009(pyrimidine-based) may be used.

The amount of the UV absorbing organic dyes used is not specifically limited, but preferably, they are included in the content of 1 to 10 wt %, more preferably 2 to 8 wt %, or 3 to 6 wt %, based on the total weight of the solid content of the undercoat layer. If the content of the UV absorbing organic dyes is less than 1 wt % based on the total weight of the solid content of the undercoat layer, UV blocking performance in the wavelength range of 405 nm may not be sufficiently secured, and if it exceeds 10 wt %, transmittance at a wavelength around 430 nm may be very low, and they may be precipitated as white spots, and thus it is preferable that the above range is fulfilled.

The UV blocking inorganic particles are introduced so as to prevent the degradation of the UV absorbing organic dyes by UV. In order to secure such effect, it is preferable that the UV blocking inorganic particles are included in the overcoat layer laminated on the undercoat layer including UV absorbing organic dyes.

Since a UV blocking film for protecting OLED devices should secure transparency, it is preferable that a haze value is low, namely, 1.5 or less. Thus, in the present invention, it is preferable that the UV blocking inorganic particles have a refractive index in the range of 1.8 to 2.1, or 1.85 to 2.05. If the refractive index of the inorganic particle exceeds 2.1, the haze value of the film for blocking ultraviolet rays may increase, and if it is less than 1.8, UV blocking efficiency may be low.

Further, in order to secure the above-described haze value, it is preferable that the average particle diameter of the UV blocking inorganic particles is in the range of 20 to 200 nm or 30 to 150 nm. If the average particle diameter of the particles is greater than 200 nm, a haze value may increase, and if it is less than 20 nm, UV blocking efficiency may be deteriorated, and thus it is preferable that the above range is fulfilled.

As the UV blocking inorganic particles, inorganic particles having UV blocking performance known in the art may be used, but it is preferable that zinc oxide (ZnO) particles are used so as to control the haze of the film for blocking ultraviolet rays. As confirmed in the experimental examples of the present invention described below, compared to well known UV blocking inorganic particles of titanium dioxide ($TiO_2$), in case zinc oxide particles are used, the haze value of the film for blocking ultraviolet rays is lower by 50% or more, and thus, they are more preferable for use in a film for protecting an OLED device.

The content of the UV blocking inorganic particles may be 10 to 50 wt %, or 20 to 50 wt %, based on the total weight of the solid content of the overcoat layer. If the content of the UV blocking inorganic particles is less than 10 wt % of the overcoat layer, the effect of protecting UV absorbing organic dyes existing in the undercoat layer may not be sufficiently exhibited, and if it is greater than 50 wt %, the haze value of the overcoat layer may increase, and thus it is preferable that the above range is fulfilled.

Meanwhile, the undercoat layer and the overcoat layer respectively include a binder resin, and as the binder resin, a photocurable binder resin may be suitably used. If plastic resin such as PMMA, polyvinyl butyral, and the like is used, humidity and heat resistance of the film for blocking ultraviolet rays may be deteriorated, and if a fluorine-containing plastic resin such as PVDF, PVDF-HFP, and the like is used, haze may be high, and thus they are not suitable for use in an OLED protection film.

As the photocurable binder resin, polymers of photopolymerizable compounds capable of inducing a polymerization reaction if light such as UV is irradiated, that are commonly used in the technical field to which the present invention pertains, may be used. As the photopolymerizable compound, one or more selected from a group of reactive acrylate oligomers; and a group of multifunctional (meth) acrylate-based monomers may be used.

The reactive acrylate oligomers may be one or more selected from the group consisting of a urethane acrylate oligomer, an epoxide acrylate oligomer, polyester acrylate, and polyether acrylate.

The multifunctional (meth)acrylate-based monomers may be di- to hexafunctional (meth)acrylate-based monomers. Herein, the (meth)acrylate means to include both acrylate and methacrylate.

Although the kinds of the multifunctional (meth)acrylate-based monomers are not limited thereto, for example, they may be one or more selected from the group consisting of trimethylolpropane tri(meth)acrylate, pentaerythritol di(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, and glycerine propoxylate triacrylate.

Herein, the photocurable binder resins used in the undercoat layer and the overcoat layer are not necessarily the same. Preferably, the undercoat layer may use polymers of one or more photopolymerizable compounds selected from the group consisting of a urethane acrylate oligomer, trimethylolpropane tri(meth)acrylate, pentaerythritol tri(meth)acrylate, and dipentaerythritol hexaacrylate as a binder, so as to secure compatibility with the UV absorbing organic dyes and mechanical properties of the coating layer, and the overcoat layer may use polymers of one or more photopolymerizable compounds selected from the group consisting of pentaerythritol tri(meth)acrylate, glycerine propoxylate triacrylate(GPTA), dipentaerythritol pentaacrylate (DPEPA), and dipentaerythritol hexa(meth)acrylate as a binder, so as to secure compatibility with the UV blocking inorganic particles and adhesion to the undercoat layer.

In addition, the undercoat layer and the overcoat layer may respectively include one or more additives. The additives are used to form a uniform coating layer, and materials having good leveling properties without an influence on the aggregation of particles may be preferably used. For example, as the additives, fluorine-based and silicon-based additives having good compatibility with an acryl binder may be used, and preferably, one or more additives selected from the group consisting of F553 (DIC Corporation), F477 (DIC Corporation), T210 (Tego Corporation), and T410 (Tego Corporation) may be used.

Such additives may be included in the content of 0.1 to 0.5 wt % in each of the undercoat layer and overcoat layer, so that the above-explained effect may be secured without hindering the transmittance and haze properties of the film for blocking ultraviolet rays.

The thickness of the undercoat layer is not specifically limited, but in order to simultaneously secure optical properties and mechanical properties, it may be preferably in the range of 1 to 10 μm, or 3 to 8 μm. Further, it is preferable that the thickness of the overcoat layer is in the range of 1 to 5 μm, 1 to 4 μm, or 1 to 2 μm, considering the total thickness including coating layers.

According to one embodiment of the present invention, the undercoat layer may be obtained by coating a photopolymerizable coating composition including a photocurable binder resin, a photopolymerization initiator, and UV absorbing organic dyes on a polymer base, and photopolymerizing the coated product. Similarly, the overcoat layer may be obtained by coating a photopolymerizable coating composition including a photocurable binder resin, a photopolymerization initiator, and UV blocking inorganic particles on the undercoat layer, and photopolymerizing the coated product. Each photopolymerizable coating composition may further include the above-explained additives.

As the photopolymerization initiator, those known to be usable in a photocurable coating composition may be used without specific limitations, and specifically, benzophenone-based compounds, acetophenone-based compounds, biimidazole-based compounds, triazine-based compounds, oxime-based compounds, or mixtures thereof may be used.

Based on 100 parts by weight of the photopolymerizable compounds, the photopolymerization initiator may be used in the content of 1 to 100 parts by weight, 1 to 50 parts by weight, or 1 to 20 parts by weight. Also, the content of the photopolymerization initiator in the photocurable coating composition may be adjusted to 0.1 wt % to 15 wt %, or 1 wt % to 10 wt %, based on the solid content of the photocurable coating composition.

If the content of the photopolymerization initiator is too small, remaining materials without being cured may be generated in the photocuring step of the photocurable coating composition. If the content of the photopolymerization initiator is too large, unreacted initiators may remain as impurities, or crosslinking density may decrease, and thus the mechanical properties of the prepared film may be deteriorated or reflectance may be significantly increased.

Meanwhile, the photocurable coating composition may further include an organic solvent. As non-limiting examples of the organic solvent, ketones, alcohols, acetates, and ethers, or mixtures thereof may be mentioned. As specific examples of the organic solvent, ketones such as methylethyl ketone, methyl isobutyl ketone, acetylacetone, isobutyl ketone, and the like; alcohols such as methanol, ethanol, n-propanol, iso-propanol, n-butanol, iso-butanol, t-butanol, and the like; acetates such as ethyl acetate, iso-propyl acetate, polyethylene glycol monomethyl ether acetate, and the like; ethers such as tetrahydrofuran, propylene glycol monomethyl ether, and the like; or mixtures thereof may be mentioned.

For the application of the photopolymerizable coating composition, commonly used methods and devices may be used without specific limitations, and for example, bar coating such as Mayer bar coating, gravure coating, 2 roll reverse coating, vacuum slot die coating, 2 roll coating, and the like may be used.

In the step of photopolymerizing the photopolymerizable coating composition, ultraviolet rays or visible rays in the wavelength of 200-400 nm may be irradiated, and during the irradiation, the exposure amount may preferably be 100 to 4000 mJ/cm². The exposure time is not specifically limited, and may be appropriately varied according to the exposure equipment used, wavelength of irradiated rays, or exposure amount. Further, in the step of photopolymerizing the photopolymerizable coating composition, nitrogen purging may be conducted so as to apply a nitrogen atmosphere condition.

Hereinafter, preferable examples are presented for better understanding of the present invention, but the following examples are presented only as illustrations of the present invention, and it is obvious to one of ordinary knowledge in the art that various alterations and modifications may be made within the categories and the scope of the technical ideas of the present invention, and such alterations and modifications pertain to the claims attached hereto.

EXAMPLE

In the following example, material names written in abbreviations are as follows.

<binder>
TMPTA: trimethylolpropane triacrylate
UA7933: difunctional urethane acrylate oligomer (SK ENTIS, weight average molecular weight 3000)
PETA: pentaerythritol triacrylate (Kyoeisha)
DPHA: dipentaerythritol hexaacrylate (SK CYTEC)
306T: hexafunctional urethane acrylate (Kyoeisha, weight average molecular weight 1,000)
PVDF: polyvinylidene fluoride (Sigma-Aldrich, weight average molecular weight: 530,000)
PVDF-HFP: polyvinylidene fluoride-co-hexafluoropropylene (Solvay, SOLEF® 21508)
<UV Absorbing Organic Dyes>
UA-3912: BONASORB UA-3912 (Orient Chemical, Ltd., indole-based organic dye)
FDB-009: pyrimidine-based dye represented by the following Chemical Formula 1 (Yamada Corporation)

[Chemical Formula 1]

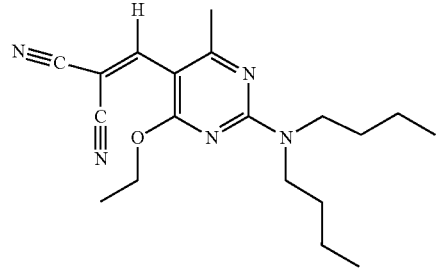

<Initiator>
I-184: Irgacure® 184 (Ciba Corporation)
<Solvents>
IPA: isopropyl alcohol
MEK: methyl ethyl ketone
EtOH: ethanol
MIBK: methyl isobutyl ketone
<Additives>
F 477: Megaface F477 (DIC Corporation)

Examples 1 to 3 and Comparative Examples 1 to 3

(1) Preparation of Undercoat Layer

A undercoat composition having the composition of the following Table 1 was prepared, and coated on one side of a triacetyl cellulose (TAC) film of a 60 µm thickness with a #12 Mayer bar, and then dried at 60° C. for 2 minutes. To the dried product, UV of 100 mJ/cm² was irradiated to prepare a undercoat layer of a 4 µm thickness.

TABLE 1

| Kinds of ingredients | Material name | Solution content(parts by weight) | Solid content(wt %) |
|---|---|---|---|
| Binder | TMPTA | 36.76 | 92% |
| UV absorbing organic dye | UA-3912 | 1.84 | 4.6% (5%, based on binder) |
| Initiator | I-184 | 1.47 | 3.7% |
| Solvent | IPA | 20.29 | — |
|  | MEK | 39.60 | — |
| Additives | F477 | 0.04 | 0.1 |
| Total |  | 100.00 | 100% |

(2) Preparation of Overcoat Layers

The overcoat compositions of Comparative Examples 1 to 3 and Examples 1 to 4 were prepared with the compositions (parts by weight) of the following Tables 2 and 3.

Each overcoat composition was coated on the undercoat layer prepared in the above (1), and then dried at 60° C. for 2 minutes. Herein, except for Example 3, all the compositions were coated with a #4 Mayer bar, and Example 3 was coated with a #8 Mayer bar. To the dried products, UV of 200 mJ/cm$^2$ of was irradiated to prepare overcoat layers of a 1 to 2 μm thickness (Examples 3 with 3 to 4 μm thickness).

TABLE 2

| Kind of component | Material name | Comparative Example 1 | Comparative Example 2 |
|---|---|---|---|
| Binder | PETA | 19.64 (48.94) | 17.76 (46.50) |
|  | DPHA | 19.64 (48.94) | 17.76 (46.50) |
| Initiator | I-184 | 0.77 (1.93) | 0.70 (1.83) |
| Inorganic particles | TiO$_2$ (16 nm) (20% in MIBK) | 0.00 (0.00) | 9.54 (5.00) |
| Additives | F477 | 0.07 (0.18) | 0.07 (0.17) |
| solvent | MEK | 14.22 | 12.86 |
|  | Ethyl cellosolve | 12.80 | 11.58 |
|  | Ethyl acetate | 24.18 | 21.87 |
|  | Diacetone alcohol | 8.72 | 7.89 |
| Total |  | 100.0 | 100.0 |

TABLE 3

| Kind of component | Material name | Comparative Example 3 | Example 1 | Example 2 | Example 3 |
|---|---|---|---|---|---|
| Binder | PETA | 18.65 (46.5) | 15.70 (39.2) | 9.79 (24.4) | 9.79 (24.4) |
|  | DPHA | 18.65 (46.5) | 15.70 (39.2) | 9.79 (24.4) | 9.79 (24.4) |
| Initiator | I-184 | 0.74 (1.8) | 0.62 (1.5) | 0.39 (1.0) | 0.39 (1.0) |
| Inorganic particles | ZnO (100 nm) (40% in EtOH) | 5.01 (5.0) | 20.00 (20.0) | 50.10 (50.0) | 50.10 (50.0) |
| Additives | F477 | 0.07 (0.2) | 0.07 (0.2) | 0.07 (0.2) | 0.07 (0.2) |
| solvent | MEK | 13.51 | 11.37 | 7.09 | 7.09 |
|  | Ethyl cellosolve | 12.16 | 10.23 | 6.38 | 6.38 |
|  | Ethyl acetate | 22.96 | 19.32 | 12.05 | 12.05 |
|  | Diacetone alcohol | 8.29 | 6.97 | 4.35 | 4.35 |
| Total |  | 100.0 | 100.0 | 100.0 | 100.0 |

* The descriptions in the parentheses in Tables 2 and 3 mean the wt % of corresponding component in the solid content except solvents.

Example 4 and Comparative Examples 4 to 5

(1) Preparation of an Undercoat Layer

A undercoat composition having the composition of the following Table 4 was prepared, and coated on one side of a triacetyl cellulose (TAC) film of a 60 μm thickness with a #12 Mayer bar, and then dried at 60° C. for 2 minutes. To the dried product, UV of 100 mJ/cm$^2$ was irradiated to prepare a undercoat layer of a 4 μm thickness.

TABLE 4

| Kind of component | Material name | Solution content (parts by weight) | Solid content (wt %) |
|---|---|---|---|
| Binder | UA7933 | 19.08 | 92.59% |
|  | TMPTA | 19.08 |  |
| UV absorbing organic dye | FDB-009 (10% in MEK) | 14.50 | 3.52% (3.80% based on binder) |
| Initiators | I-184 | 1.53 | 3.70% |
| Solvents | IPA | 10.69 | — |
|  | MEK | 34.35 | — |
| Additives | F477 (10% in MEK) | 0.76 | 0.19% |
| Total |  | 100.00 | 100% |

(2) Preparation of Overcoat Layers

The overcoat layers of Example 4 and Comparative Example 5 were prepared with the compositions (parts by weight) of the following Table 5.

Each overcoat composition was coated on the undercoat layer prepared in (1) with a #8 Mayer bar, and then dried at 60° C. for 2 minutes. To the dried product, UV 200 mJ/cm$^2$ of was irradiated to prepare overcoat layers of a 3 to 4 μm thickness.

A film for blocking ultraviolet rays including only the undercoat layer of (1) without an overcoat layer was designated as Comparative Example 4.

TABLE 5

| Kind of component | Material name | Comparative Example 4 | Comparative Example 5 | Example 4 |
|---|---|---|---|---|
| Binder | PETA | No overcoat | 14.72 (36.68) | 9.88 (24.63) |
|  | DPHA |  | 4.91 (12.23) | 3.29 (8.21) |
|  | 306T |  | 9.81 (24.46) | 6.58 (16.42) |
|  | TMPTA |  | 9.81 (26.46) | 6.58 (16.42) |
| Initiator | I-184 |  | 0.78 (1.93) | 0.52 (1.30) |
| Inorganic particles | ZnO (25 nm) (40% in MIBK) |  | — | 32.92 (32.85) |
| Additives | F477 |  | 0.10 (0.25) | 0.07 (0.16) |
| Solvents | MEK |  | 13.74 | 9.22 |
|  | Ethyl cellosolve |  | 12.76 | 8.55 |
|  | Ethyl acetate |  | 24.54 | 16.46 |
|  | Diacetone alcohol |  | 8.83 | 5.93 |
| Total |  |  | 100.0 | 100.0 |

* The descriptions in the parentheses in Table 5 mean the wt % of corresponding component in the solid content except solvents.

Comparative Examples 6 to 9

(1) Preparation of Undercoat Layers

The undercoat compositions of Comparative Examples 6 and 7 with the composition of the following Table 6 and the undercoat compositions of Comparative Examples 8 and 9 with the composition of Table 7 were prepared.

Each undercoat composition was coated on one side of a triacetyl cellulose(TAC) film of 60 μm thickness with a #80 Mayer bar, and then dried at 60° C. for 5 minutes to prepare undercoat layers respectively having a 9 μm and 12 μm thickness.

TABLE 6

| Kind of component | Material name | Solution content (parts by weight) | Solid content (wt %) |
|---|---|---|---|
| Binder | PVDF (5% in NMP) | 98.28 | 96.62% |
| UV absorbing organic dye | FDB-009 (10% in MEK) | 1.47 | 2.90% |
| Additives | F477 (10% in MEK) | 0.25 | 0.48% |
| Total | | 100.00 | 100% |

TABLE 7

| Kind of component | Material name | Solution content (parts by weight) | Solid content (wt %) |
|---|---|---|---|
| Binder | PVDF-HFP (7.5% in MEK:toluene = 3:1 (w/w)) | 98.28 | 97.72% |
| UV absorbing organic dye | FDB-009 (10% in MEK) | 1.47 | 1.95% |
| Additives | F477 (10% in MEK) | 0.25 | 0.33% |
| Total | | 100.00 | 100% |

(2) Preparation of Overcoat Layers

Overcoat compositions were prepared with the compositions (parts by weight) of the following Table 8, and coated on the undercoat layers prepared in (1) with a #8 Mayer bar, and then dried at 60° C. for 2 minutes. To the dried product, UV of 200 mJ/cm$^2$ was irradiated to prepare overcoat layers of a 3 to 4 μm thickness.

TABLE 8

| Kind of component | Material name | Comparative Example 6 | Comparative Example 7 | Comparative Example 8 | Comparative Example 9 |
|---|---|---|---|---|---|
| Composition of undercoat | | | Table 6 | | Table 7 |
| Binder | PETA | No overcoat | 11.73 (29.24) | No overcoat | 11.73 (29.24) |
| | DPHA | | 3.91 (9.75) | | 3.91 (9.75) |
| | 306T | | 7.82 (19.50) | | 7.82 (19.50) |
| | TMPTA | | 7.82 (19.50) | | 7.82 (19.50) |
| Initiator | I-184 | | 0.62 (1.54) | | 0.62 (1.54) |
| Inorganic particles | ZnO (25 nm) (40% in MIBK) | | 20.33 (20.28) | | 20.33 (20.28) |
| Additives | F477 | | 0.08 (0.19) | | 0.08 (0.19) |
| Solvent | MEK | | 10.95 | | 10.95 |
| | Ethyl cellosolve | | 10.16 | | 10.16 |
| | Ethyl acetate | | 19.55 | | 19.55 |
| | Diacetone alcohol | | 7.04 | | 7.04 |
| Total | | | 100 | | 100 |

* The descriptions in the parentheses in Table 7 mean the wt % of corresponding component in the solid content except solvents.

Experimental Example

1. Light Resistance Test

Each film for blocking ultraviolet rays obtained in the preparation examples was exposed under a UVA lamp at a temperature of 50° C., irradiance of 0.55 W/m$^2$, and a wavelength of 290-400 nm for 48 hours.

2. Measurement of Transmittance

The transmittances of the film for blocking ultraviolet rays before and after the light resistance test were measured as follows. Using a UV-VIS-NIR spectrophotometer (model name: Solidspec-3700, manufacturing company: Shimadzu), while a state without a film was designated as a base line, the transmission spectrum of the whole film including undercoat and overcoat layers was examined.

3. Measurement of Haze (Hz)

The haze value of each film for blocking ultraviolet rays was measured according to the standard of JIS K 7136.

4. Measurement of Total Light Transmittance(Tt)

The total light transmittance of each film for blocking ultraviolet rays was measured according to the standard of JIS K 7361.

The experiment results are shown in the following Tables 9 to 11.

TABLE 9

|  | Comparative Example 1 | Comparative Example 2 | Comparative Example 3 | Example 1 | Example 2 | Example 3 |
|---|---|---|---|---|---|---|
| Kind/content of inorganic particles | None/0% | TiO$_2$/5% | ZnO/5% | ZnO/20% | ZnO/50% | ZnO/50% |
| Thickness of overcoat layer | 1~2 μm | 1~2 μm | 1~2 μm | 1~2 μm | 1~2 μm | 3~4 μm |
| Wavelength | Transmittance before light resistance test (%) | | | | | |
| 405 nm. | 4.49 | 2.89 | 4.05 | 5.81 | 2.55 | 2.79 |
| 430 nm. | 63.82 | 62.19 | 64.9 | 70.33 | 63.25 | 61.74 |
| Wavelength | Transmittance after light resistance test (%) | | | | | |
| 405 nm. | 29.9 | 17.35 | 22.1 | 13.26 | 4.49 | 3.67 |
| 430 nm. | 77.8 | 70.51 | 72.43 | 69.02 | 60.26 | 59.56 |
| Change rate of 405 nm transmittance ** | 6.66 | 5.99 | 5.46 | 2.28 | 1.76 | 1.32 |
| Tt (JIS K 7361) | 92.3 | 90.7 | 92.4 | 92 | 90.8 | 90.9 |
| Hz (JIS K 7136) | 0.4 | 1 | 0.4 | 0.5 | 0.6 | 1.2 |

TABLE 10

|  | Comparative Example 4 | Comparative Example 5 | Example 4 |
|---|---|---|---|
| Kind/content of inorganic particles | None/0% | None/0% | ZnO/33% |
| Thickness of overcoat layer | None | 3~4 μm | 3~4 μm |
| Wavelength | Transmittance before light resistance test (%) | | |
| 405 nm. | 0.9 | 1.2 | 1.0 |
| 430 nm. | 72.3 | 71.5 | 69.8 |
| Wavelength | Transmittance after light resistance test (%) | | |
| 405 nm. | 6.3 | 5.3 | 2.3 |
| 430 nm. | 77.1 | 76.0 | 73.0 |
| Change rate of 405 nm transmittance** | 6.94 | 4.56 | 2.20 |
| Tt (JIS K 7361) | 92.2 | 91.9 | 91.5 |
| Hz (JIS K 7136) | 0.3 | 0.3 | 0.7 |

TABLE 11

|  | Comparative Example 6 | Comparative Example 7 | Comparative Example 8 | Comparative Example 9 |
|---|---|---|---|---|
| Kind/content of inorganic particles | None/0% | ZnO/20% | None/0% | ZnO/20% |
| Thickness of overcoat layer | None | 3~4 μm | None | 3~4 μm |
| Wavelength | Transmittance before light resistance test (%) | | | |
| 405 nm. | 0.9 | 1.5 | 2.7 | 0.7 |
| 430 nm. | 41.6 | 62.5 | 72.4 | 57.8 |
| Wavelength | Transmittance after light resistance test (%) | | | |
| 405 nm. | 0.9 | 2.6 | 4.8 | 0.9 |
| 430 nm. | 37.3 | 65.1 | 75.6 | 54.5 |
| Change rate of 405 nm transmittance** | 1.04 | 1.72 | 1.77 | 1.37 |
| Tt (JIS K 7361) | 73.8 | 89.2 | 93.3 | 87.3 |
| Hz (JIS K 7136) | 95 | 59 | 10.1 | 17.8 |

**change rate of 405 nm transmittance = 405 nm transmittance after light resistance test/405 nm transmittance before light resistance test As the results of experiments, the film for blocking ultraviolet rays of Examples 1 to 4 exhibited transmittance at a 405 nm wavelength after a light resistance test, and of less than about 3 times the transmittance before the light resistance test, confirming that the UV blocking effect is maintained high even after the light resistance test. It was also confirmed that the film for blocking ultraviolet rays of the examples exhibited low haze values.

However, in the film for blocking ultraviolet rays of Comparative Example 4 without an overcoat layer, or Comparative Examples 1 and 5 without UV blocking inorganic particles in the overcoat layers, transmittance after the light resistance test remarkably increased, thus confirming that UV blocking effect cannot be maintained. Further, from the result of Comparative Example 3, it can be seen that the content of zinc oxide included in the overcoat layer should be 10 wt % or more, so as to secure the effect of the present invention.

In addition, comparing Comparative Examples 2 and 3, it can be seen that although titanium dioxide also exhibits a UV blocking effect of a similar level to that of zinc oxide, it is not suitable to be used for the protection of OLED devices because the haze value is 2 times or more higher.

Meanwhile, Comparative Examples 6 to 9 wherein as the binders of the undercoat layer and overcoat layer, fluorine-containing plastic resins were used instead of the photocurable binder, were not suitable for the protection of OLED devices because the haze values were very high, and Comparative Examples 6 and 7 wherein the PVDF binder was used exhibited inferior coatability.

The invention claimed is:

1. A film for blocking ultraviolet rays, comprising in sequence:
   a polymer base;
   an undercoat layer comprising UV absorbing organic dyes and a photocurable binder resin; and
   an overcoat layer comprising UV blocking inorganic particles and a photocurable binder resin,
   wherein a first transmittance of the film after a light resistance test is 3 times or less of a second transmittance of the film before the light resistance test, the first and second transmittance measured at a 405 nm wavelength using a UV-VIS NIR spectrophotometer and the light resistance test being conducted by exposing the film under a UVA lamp at a temperature of 50° C., irradiance of 0.55 W/m$^2$, and a wavelength of 290 to 400 nm, for 48 hours, and
   wherein the overcoat layer comprises the UV blocking inorganic particles in an amount of 10 to 32.85 wt %, based on the total weight of the solid content of the overcoat layer.

2. The film for blocking ultraviolet rays according to claim 1, wherein a third transmittance of the film measured at 430 nm using the UV-VIS-NIR spectrophotometer before the light resistance test, is at least 60%.

3. The film for blocking ultraviolet rays according to claim 1, wherein a haze value of the film measured according to the JIS K 7136 method is 1.5 or less.

4. The film for blocking ultraviolet rays according to claim 1, wherein the UV absorbing organic dye is one or more selected from the group consisting of benzotriazole-based compounds, triazine-based compounds, ester-based compounds, indole-based compounds, and pyrimidine-based compounds.

5. The film for blocking ultraviolet rays according to claim 1, wherein the undercoat layer comprises UV absorbing organic dye in an amount of 1 to 10 wt %, based on the total weight of the solid content of the undercoat layer.

6. The film for blocking ultraviolet rays according to claim 1, wherein the UV blocking inorganic particles have a refractive index of 1.8 to 2.1.

7. The film for blocking ultraviolet rays according to claim 1, wherein the UV blocking inorganic particles have an average particle diameter of 20 to 200 nm.

8. The film for blocking ultraviolet rays according to claim 1, wherein the UV protecting inorganic particles are zinc oxide.

9. The film for blocking ultraviolet rays according to claim 1, wherein the overcoat layer comprises the UV blocking inorganic particles in an amount of 20 to 32.85 wt %, based on the total weight of the solid content of the overcoat layer.

10. The film for blocking ultraviolet rays according to claim 1, wherein the photocurable binder resin is one or more photopolymerizable compounds selected from the group of a reactive acrylate oligomers and a multifunctional (meth)acrylate-based monomer, wherein the reactive acrylate oligomer is one or more selected from the group consisting of a urethane acrylate oligomer, an epoxide acrylate oligomer, polyester acrylate, and polyether acrylate; and the multifunctional (meth)acrylate-based monomer is one or more selected from the group consisting of trimethylolpropane tri(meth)acrylate, pentaerythritol di(meth)acrylate, pentaerythritol tri(meth)acrylate, pentaerythritol tetra (meth)acrylate, dipentaerythritol tri(meth)acrylate, dipentaerythritol tetra(meth)acrylate, dipentaerythritol penta (meth)acrylate, dipentaerythritol hexa(meth)acrylate, and glycerine propoxylate triacrylate.

11. The film for blocking ultraviolet rays according to claim 1, wherein the undercoat layer has a thickness of 1 to 10 μm.

12. The film for blocking ultraviolet rays according to claim 1, wherein the overcoat layer has a thickness of 1 to 5 μm.

13. The film for blocking ultraviolet rays according to claim 1, wherein the photocurable binder resin in the undercoat layer is different from the photocurable binder resin in the overcoat layer.

14. The film for blocking ultraviolet rays according to claim 1, wherein the photocurable binder resin in the undercoat layer is selected from the group consisting of a urethane acrylate oligomer, trimethylolpropane tri(meth)acrylate, pentaerythritol tri(meth)acrylate, and dipentaerythritol hexaacrylate.

15. The film for blocking ultraviolet rays according to claim 1, wherein the photocurable binder resin in the overcoat layer is selected from the group consisting of pentaerythritol tri(meth)acrylate, glycerine propoxylate triacrylate, dipentaerythritol pentaacrylate, and dipentaerythritol hexa(meth)acrylate.

16. The film for blocking ultraviolet rays according to claim 1, wherein the polymer base is selected from the group consisting of
   triacetyl cellulose, a cycloolefin polymer, polyacrylate, polycarbonate, and polyethylene terephthalate.

17. A method for preparing the film for blocking ultraviolet rays according to claim 1 comprising the steps of
   providing a polymer base
   coating a photopolymerizable coating composition including a photocurable binder resin, a photopolymerization initiator and UV absorbing organic dyes on the polymer base and polymerizing the coated polymer base to obtain an undercoat layer, and
   coating a photopolymerizable coating composition including a photocurable binder resin, a photopolymerization initiator, and UV blocking inorganic particles on the undercoat layer, and photopolymerizing the coated undercoat layer to obtain an overcoat layer.

18. An OLED device comprising the film for blocking ultraviolet rays of claim 1.

* * * * *